United States Patent
Mori et al.

(10) Patent No.: US 6,223,169 B1
(45) Date of Patent: Apr. 24, 2001

(54) ELECTRONIC TRANSACTION PROCESSING SYSTEM WITH ESCROW CARD

(75) Inventors: Toru Mori; Makoto Saruya, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 08/990,457

(22) Filed: Dec. 15, 1997

(30) Foreign Application Priority Data

Dec. 16, 1996 (JP) .................................... 8-335886

(51) Int. Cl.[7] .................................................. G06F 17/60
(52) U.S. Cl. ........................................................ 705/41
(58) Field of Search ............................... 705/41, 42, 43, 705/44, 40, 410; 235/380, 381, 379

(56) References Cited

U.S. PATENT DOCUMENTS

| | | | |
|---|---|---|---|
| 4,091,448 | 5/1978 | Clausing | 235/379 |
| 4,197,986 | 4/1980 | Nagata | 235/379 |
| 4,680,728 * | 7/1987 | Davis et al. | 345/141 |
| 4,877,947 | 10/1989 | Mori | 235/380 |
| 4,900,903 * | 2/1990 | Wright et al. | 235/380 |
| 4,926,325 * | 5/1990 | Benton et al. | 705/39 |
| 5,426,281 | 6/1995 | Abecassis | 235/379 |
| 5,649,117 * | 7/1997 | Landry | 705/40 |
| 5,812,400 * | 9/1998 | Eddy et al. | 705/410 |

FOREIGN PATENT DOCUMENTS

| | | |
|---|---|---|
| 0 242 624 | 10/1987 | (EP) . |
| 0 348 959 | 1/1990 | (EP) . |
| 7-104891 | 2/1988 | (JP) . |
| 404182889 * | 6/1992 | (JP) . |

OTHER PUBLICATIONS

Haisten, Card blanche, May 1994, Credit Union Management v17n5 pp. 23–25, DialogWeb copy pp. 1–5.*

* cited by examiner

Primary Examiner—Emanuel Todd Voeltz
Assistant Examiner—Thomas A. Dixon
(74) Attorney, Agent, or Firm—Venable; Robert J. Frank; Jeffrey W. Gluck

(57) ABSTRACT

An electronic transaction processing system for transferring a monetary value between a payer and a receiver includes a first memory apparatus storing a payer's digital cash, a second memory apparatus storing a receiver's digital cash, and a third memory apparatus storing temporarily the payer's digital cash transferred from the first memory apparatus. A transaction is processed by transferring the digital cash transferred from the first memory apparatus to the second memory apparatus via the third memory apparatus.

14 Claims, 11 Drawing Sheets

< DIGITAL CASH DEPOSIT >

ACCOUNT NUMBER NO. 345-0402425
XX BANK MR/MS○○ TARO
BALANCE $2511.63

CARD NUMBER NO. 345-0402425
XX BANK MR/MS○○ TARO
BALANCE $1604.18

TRANSACTION AMOUNT
$ ○○○,○○○

TRANSACTION LIMIT AMOUNT
$1604.18

| 7 | 8 | 9 |
| 4 | 5 | 6 |
| 1 | 2 | 3 |
| 0 | 000 | |

CANCELLATION    AMENDMENT    CONFIRMATION

FIG. 9

ELECTRONIC TRANSACTION PROCESSING SYSTEM WITH ESCROW CARD

BACKGROUND OF THE INVENTION

This invention relates to an electronic transaction system employing microchip cards which receive, electronically store and transfer there between digitized information relating to the monetary value of financial transactions.

An electronic transaction processing system using a prepaid microchip card is disclosed in U.S. Pat. No. 4,877,947. The patented system employs a customer's microchip card in which the customer's monetary value is digitally stored and a vendor's microchip card in which the vendor's monetary value is digitally stored. When a purchase is made, the customer inserts his card in a customer's microchip card reader/writer and enters a password on an attached keypad The vendor enters the amount of the purchase on a keypad connected to a vendor's microchip card reader/writer in which the vendor's card has been inserted. The amount of the purchase is communicated from the vendor's microchip card reader/writer to the customer's microchip card reader/writer, and then from the two microchip card reader/writers to both microchip cards. With suitable verifications, the amount of the purchase is deducted from the balance recorded in the customer's microchip card and added to the balance recorded in the vendor's microchip card.

An electronic transaction system transferring a monetary value between an automated teller machine and a customer's microchip card is disclosed in PCT International Publication Number WO95/24690. In this system, the automated teller machine includes an ATM card in its housing in which a bank's monetary value is stored. A monetary value is transferred from or to the customers microchip card via the ATM card. In case of withdrawal, the customer's microchip card is inserted by the customer in the automated teller machine, and the monetary value corresponding to the transaction amount he or she wishes to withdraw is transferred from the ATM card to the customer's microchip card. As a result, the monetary value in the customer's microchip card is increased, and the monetary value in the ATM card is decreased. In case of deposit, the monetary value is transferred from the customer's microchip card to the ATM card.

The electronic transaction system has many advantages over a cash payment system. However, to increase its popularity, the system must be secure against loss of monetary value, especially loss caused by a malfunction of the system when the monetary value is transferred.

SUMMARY OF THE INVENTION

In a conventional payment system using bank notes and coins, the bank notes and coins are handled by a payer or a receiver. Therefore, it is easy to confirm where the bank notes and coins are placed and their value. However, when the monetary value of the transaction is digitized, i.e., it is in the form of digital cash, confirmation is difficult because the monetary value of the digital cash is hidden. Therefore, it is desirable to clarify the ownership of digital cash in a transaction.

Accordingly, it is an object of the present invention to clarify the ownership of digital cash.

It is another object of the present invention to cl the ownership of digital cash in a deposit transaction using an automatic teller machine.

This invention is an electronic transaction processing system for transferring a monetary value between a payer and a receiver comprising a first memory apparatus owned by the payer which stores digital cash of the payer, a second memory apparatus owned by the receiver which stores digital cash of the receiver, and a third memory apparatus which temporarily stores digital cash of the payer.

A transaction is processed by deducting the transfer amount from the digital cash in the first memory apparatus and adding the transfer amount to the digital cash in the second memory apparatus. This transaction processing is via the third memory apparatus.

BRIEF DESCRIPTION OF THE DRAWINGS

The present invention is illustrated in the following drawings in which:

FIGS. 8 and 9 are examples of displays appearing on the customer operation panel of FIG. 2:

DETAILED DESCRIPTION OF THE PREFERRED EMBODIMENTS

The first embodiment of the invention will first be explained.

Figure 2:
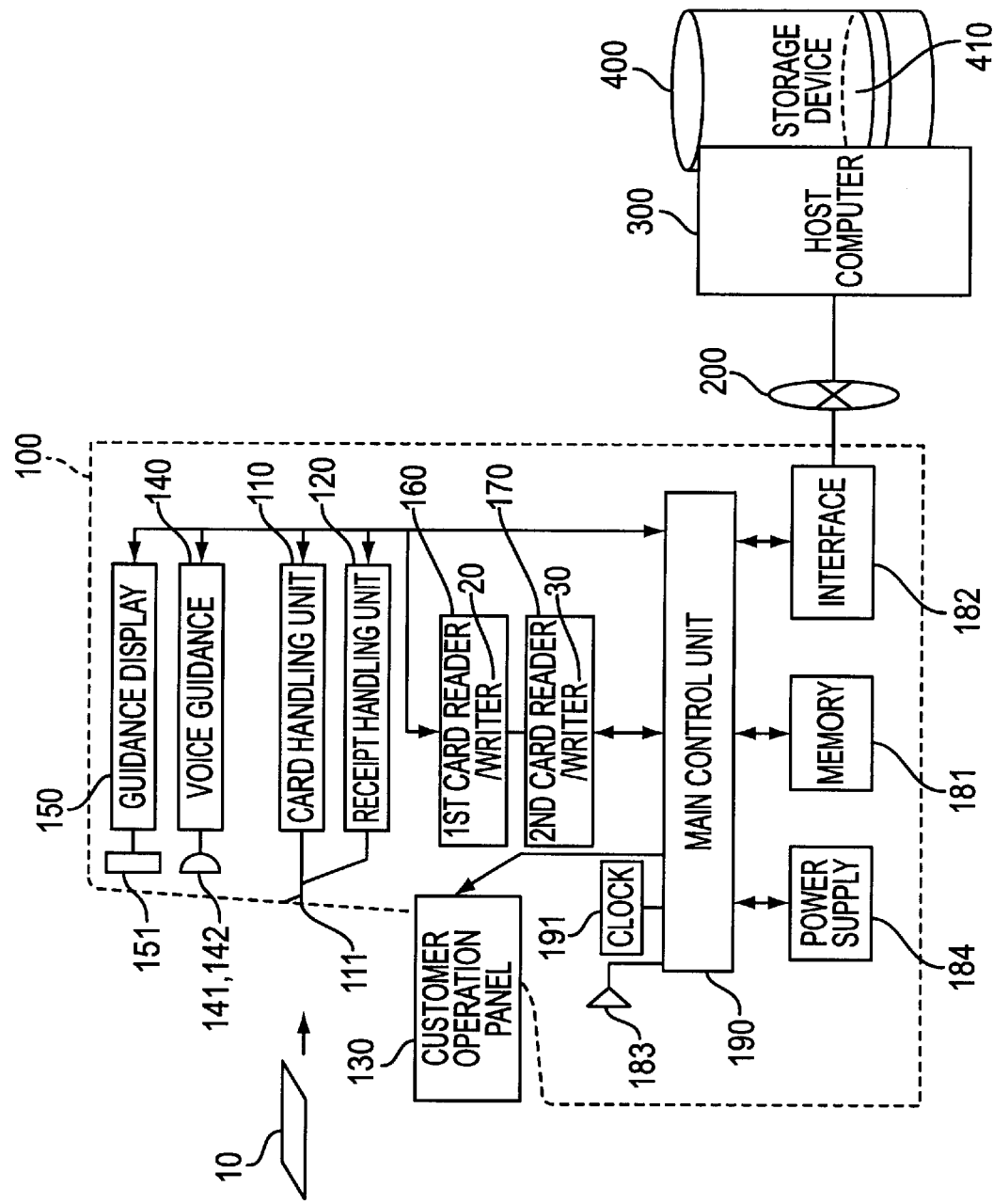
FIG. 2 is a block diagram of an automatic teller machine according to a first embodiment of the present invention.
Figure 3:
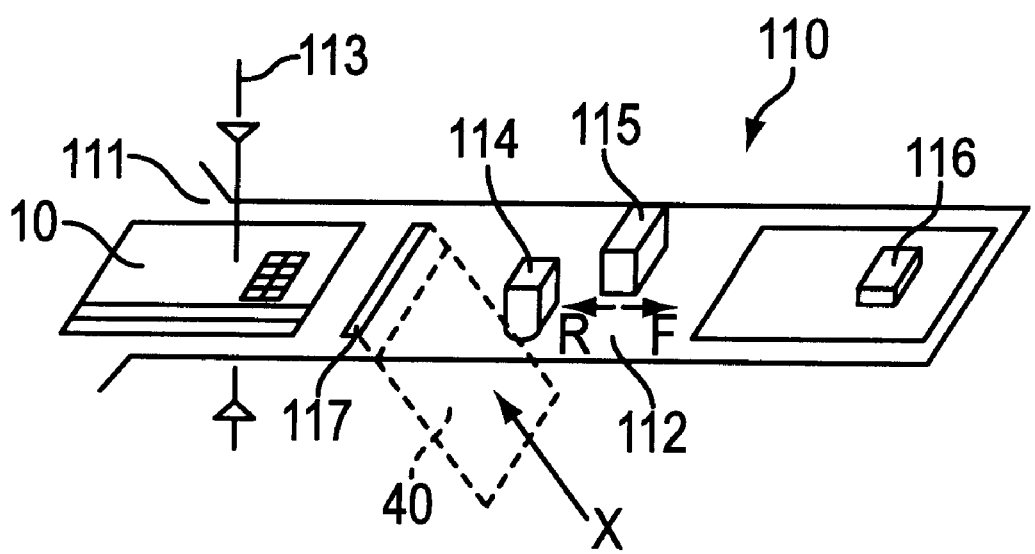
FIG. 3 is a schematic diagram of a card handling unit shown in FIG. 2.

Referring to FIGS. 2 and 3, there is shown an automatic teller machine 100 associated with and in communication with a particular bank forming a part of the electronic transaction processing system. The teller machine 100 is installed at a location accessible to the public, such as a department store, convenience store, gas station or the bank's own facility The teller machine 100 is connected by a communication line 200 to a host computer 300 which controls a storage device 400 having a deposit ledger file 410.

The deposit ledger file 410 stores the addresses, names, ages, occupations, account numbers, passwords and balance data of each of the bank's customers. The balance data is renewed by the host computer 300 whenever a transaction is carried out, and therefore, the deposit ledger file 410 always stores the latest balance information of each customer.

A card handling unit 110 writes and reads information stored in a customer money card (a first memory apparatus) 10. A card insertion/return opening 111 is provided at the front of the automatic teller machine 100 for accepting and discharging the card 10. A card conveyance path 112 (FIG.3) conveys the customer money card 10 in the direction of either the arrow R or F by means of a roller (not shown).

The card handbag unit 110, shown in FIG. 3 includes a detection device 113, consisting of a light-emitting element and a light-receiving element, to detect the customer money card 10 when the card is interposed between the light-emitting and receiving elements thereby cutting off a light beam transmitted between the elements.

A magnetic information reader 114 reads information written on a magnetic stripe of the card 10, and an embossed character reader 115 reads optically convex characters provided on the card 10. A microchip card reader/writer 116 connects to the card 10 physically and electrically and transmits information to and receives information from the card 10. An opening 117 is provided in the card conveyance path 112 for issuance of a receipt 40 in the direction of the arrow X, the receipt being printed by a receipt handling unit 120 (FIG. 2). The receipt handling unit 120 prints the contents of each transaction and issues the receipt 40 to the customer through the opening 117. The magnetic information reader 114, the embossed character reader 115 and the microchip card reader/writer 116 are provided in the card conveyance path 112. These components are held by a support member (not shown) and are operated by a drive control circuit (not shown).

A customer operation panel 130 (FIG. 2) comprises a touch screen for displaying characters and pictures that represent transaction operation such as "withdrawal" and "deposit" to the customer. The customer selects the desired transaction item from the panel 130. A voice guidance unit 140, comprising a speaker 141 and a microphone 142, is provided at the front of the automatic teller machine to present operating information in the form of speech to the customer. Also, a guidance display 150 displays transaction items on a flat-panel display 151.

A first card reader/writer 160 is connected physically and electrically to a bank money card 20 (a second memory apparatus), and information is transmitted to the bank money card 20 by associated control software. Similarly, a second card reader/writer 170 connects physically and electrically to an escrow card 30 (a third memory apparatus), and information is transmitted to the escrow card 30 by associated control software.

A memory 181 is provided which comprises a flexible disk for storing transaction histories. Also, a read only memory (ROM) and a random access memory (RAM) are provided for storing the control program of the automatic teller machine 100. An approach detection device 183, which employs ultrasound, detects when a customer approaches the automatic teller machine 100. Upon detecting the approach of a customer the automatic teller machine 100 switches from a waiting condition to an active condition.

A main control unit 190, which is connected by an interface 182 to the host computer 300, controls every component mentioned above and has a clock 191 that provides time information. A power supply 184 supplies electric power to each of the components comprising the automatic teller machine 100. The memory 181 and clock 191 are actuated by a battery (not shown) to sure that information stored in the memory is retained and that the clock does not stop even if the power supply 184 is shut down.

The customer money card 10 is a microchip card that contains an integrated circuit and complies with international standards of size, physical and electrical characteristics, and communication protocol. The customer money card 10 can be compared to "a purse" of digital cash owned by the customer. The integrated circuit electronically and digitally stores a monetary value that corresponds to the value of the card. The digital cash balance is renewed for every transaction.

The bank money card 20 is also a microchip card containing an integrated circuit which complies with international standards. The bank money card 20 can be thought of as a "safe" containing digital cash which is housed in the automatic teller machine 100. The integrated circuit electronically and digitally stores a monetary value that corresponds to the value of the card, and the digital cash balance is renewed for every transaction.

The escrow card is also a microchip card containing an integrated circuit. The escrow card 30 can be thought of as a "temporary safe" containing digital cash which is housed in the automatic teller machine 100. The integrated circuit electronically, digitally and temporarily stores the monetary value transferred from the customer money card 10 to the bank money card 20. The integrated circuit may store transaction information if needed. The escrow card 30 will be described in connection with FIGS. 4(*a*) and 4(*b*).

Referring to FIG. 4(*a*), the escrow card 30 is provided with a magnetic stripe 31 for magnetically recording data of the kind provided on a bank card. This data identifies a bank available for carrying out a transaction, which data includes a bank number, a branch number, and a discrimination number. In addition, the magnetic stripe 31 records a code that indicates that the escrow card 30 is a microchip card Thus, discrimination to determine whether the card is a microchip card is possible by reading the magnetic stripe 31 without accessing the integrated circuit.

An embossed character area 32, using convex characters, is provided on the card 30 to indicate the bank number, the branch number, the discrimination number, and the name of the branch. For example, in FIG. 4(*a*), the bank number is "012", the branch number is "345", the discrimination number is "A00777", and the name of the branch is "NIHONBASHI/KITA". These convex characters are read by the embossed character reader 115 described in connection with FIG. 3.

Referring to FIG. 4(*b*), an integrated circuit 33 is provided in the escrow card 30 at a selected location within the card. A terminal 33*a* is attached to the integrated circuit 33 and exposed on the surface of the card to permit connection to the second card reader/writer 170. The integrated circuit 33 has a ROM 33*b* and a RAM 33*c*. The ROM 33*b* stores various processing programs that include control software such communication control and command processing software, and the RAM 33*c* stores temporarily a control program and transaction data. EEPROMs 33*d* are nonvolatile memories that write and also erase storage information and accumulate transaction data. A microprocessor 33*e* controls each memory and computes balance and transaction amounts. The number 33*f* designates a data bus. The terminal 33*a*, ROM 33*b*, RAM 33*c*, EEPROMs 33*d*, microprocessor 33*e* and data bus 33*f* are buried in the card as an integrated circuit.

Figure 5:
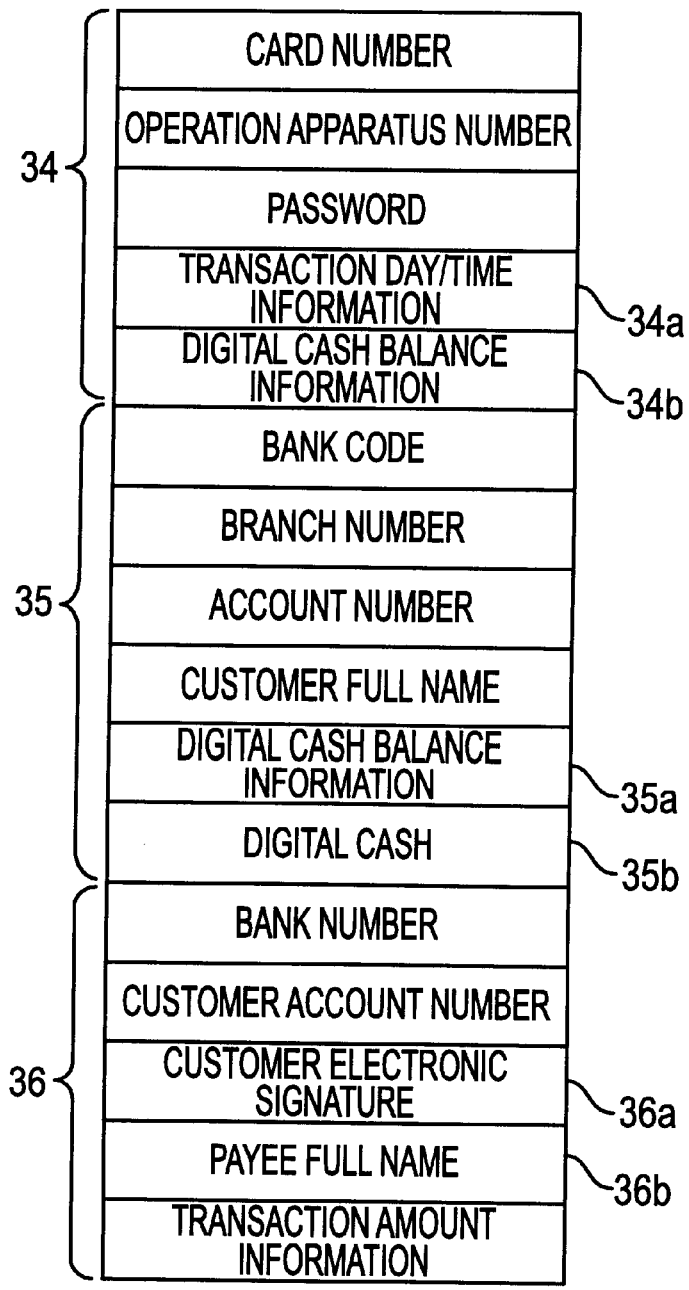
FIG. 5 shows a data format of the escrow card of FIG. 4.

The data stored within the escrow card 30 will now be described with reference to FIG. 5, which divides the data into three portions: a discrimination information portion 34, a customer information portion 35 and an electronic check information portion 36. The discrimination information 34 consists of a card number, an operation apparatus number, a password, transaction day/time information 34*a* and digital cash balance information 34*b*. The card number is a number peculiar to the escrow card 30, and the operation apparatus number is the control number of the automatic teller machine 100 in which the escrow card 30 is installed. The password is the number which must be inputted to read out transaction information on the occasion of an apparatus fault. The transaction daytime information 34a is the time when the automatic teller machine 100 was first started up after the escrow card 30 had been installed in the machine 100 to carry out an electronic transaction, and the digital cash balance information 34b is the digital cash balance information read from the bank money card 20.

The customer information 35 consists of a bank code, a branch number, an account number, the customer's full name, the digital cash customer balance information 35a and digital cash 35b transferred from the customer money card 10. The digital cash customer balance information 35a is the balance information for digital cash read from the customer money card 10 at the starting point of a transaction. The electronic check information 36 consists of a bank number, an account number, the customer's electronic signature 36a, a payee's full name 36b and the transaction amount information.

In the above description, the escrow card 30 stores the discrimination information 34, the customer information 35 and the electronic check information 36, but it is not necessary for the escrow card 30 to store all of this information. The escrow card 30 is provided for storing digital cash in the invention, so it is enough for the escrow card 30 to store digital cash 35b.

Figure 4A:
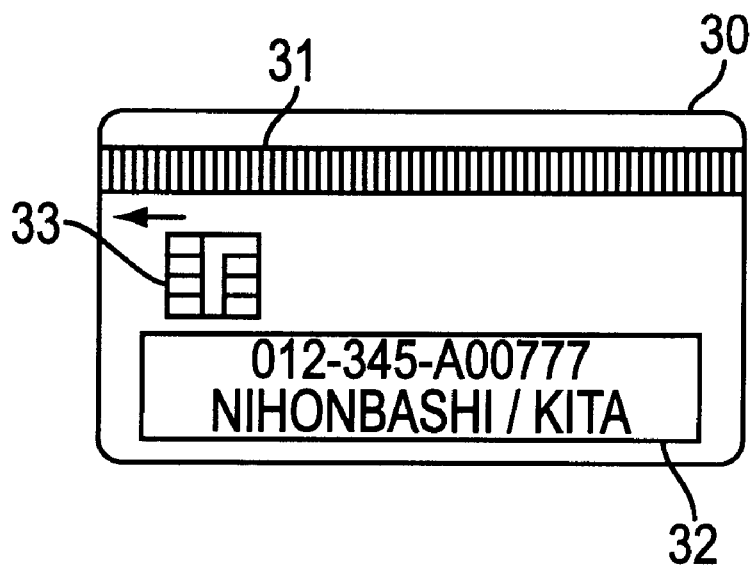
FIGS. 4(*a*) and 4(*b*) show schematic illustrations of an escrow card used with the present invention.
Figure 4B:
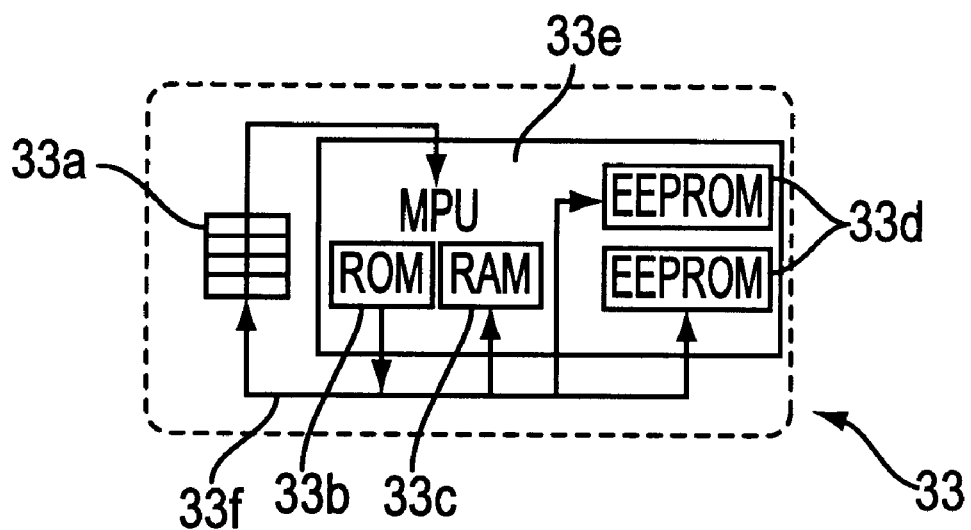

The customer money card 10 is also shown by FIGS. 4(a) and 4(b) except that the name of the breach is omitted. The bank money card 20 is also shown by FIGS. 4(a) and 4(b).

Figure 1:
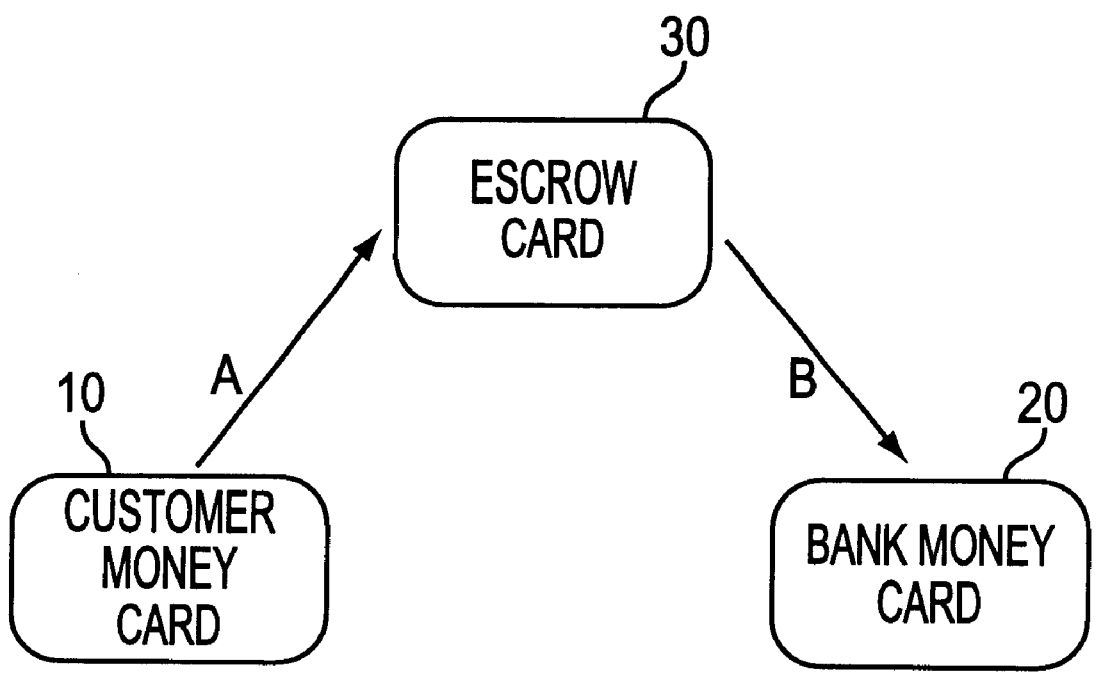
FIG. 1 is a diagrammatic illustration of electronic transactions by integrated circuit cards for carrying out several embodiments of the present invention.

Referring to FIG. 1, the following is an outline of the operation of the electronic transaction system of the present invention. In an initial step, an amount of digital cash stored in the customer's money card 10 is transferred to the escrow card 30 as indicated by arrow A. The amount of transferred digital cash corresponds to the transaction amount input by the customer for deposit. As a result, the digital cash balance stored in the customer money card 10 is decreased by the transaction amount, and the digital cash balance stored in the escrow card 30 is increased by the transaction amount. After renewal, the digital cash balance stored in both the customer money card 10 and the escrow card 30 is checked for correctness. When the digital cash balance is correct and the customer confirm it, all of the digital cash in the escrow card 30 is transferred to the bank money card 20 as indicated by arrow B. As a result, the digital cash balance stored in the escrow card 30 is decreased to zero, and the digital cash balance stored in the bank money card 20 is increased by the transaction amount.

Details of various transactions for which the electronic transaction processing system of this invention may be used will now be described.

Digital Cash Deposit Processing

Figure 6:
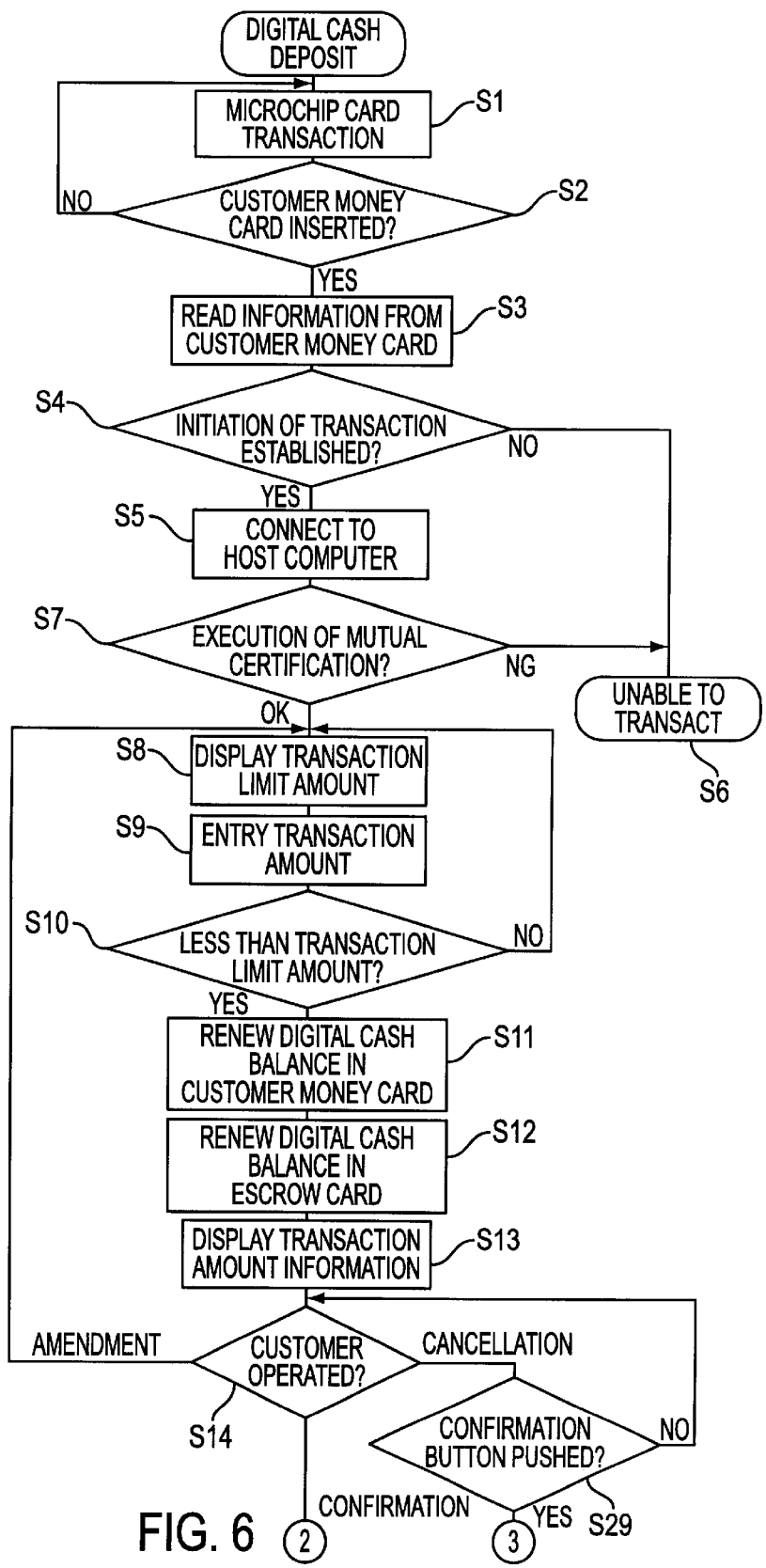
FIGS. 6 and 7 an flow chat showing electronic transactions carried out with the present invention.
Figure 7:
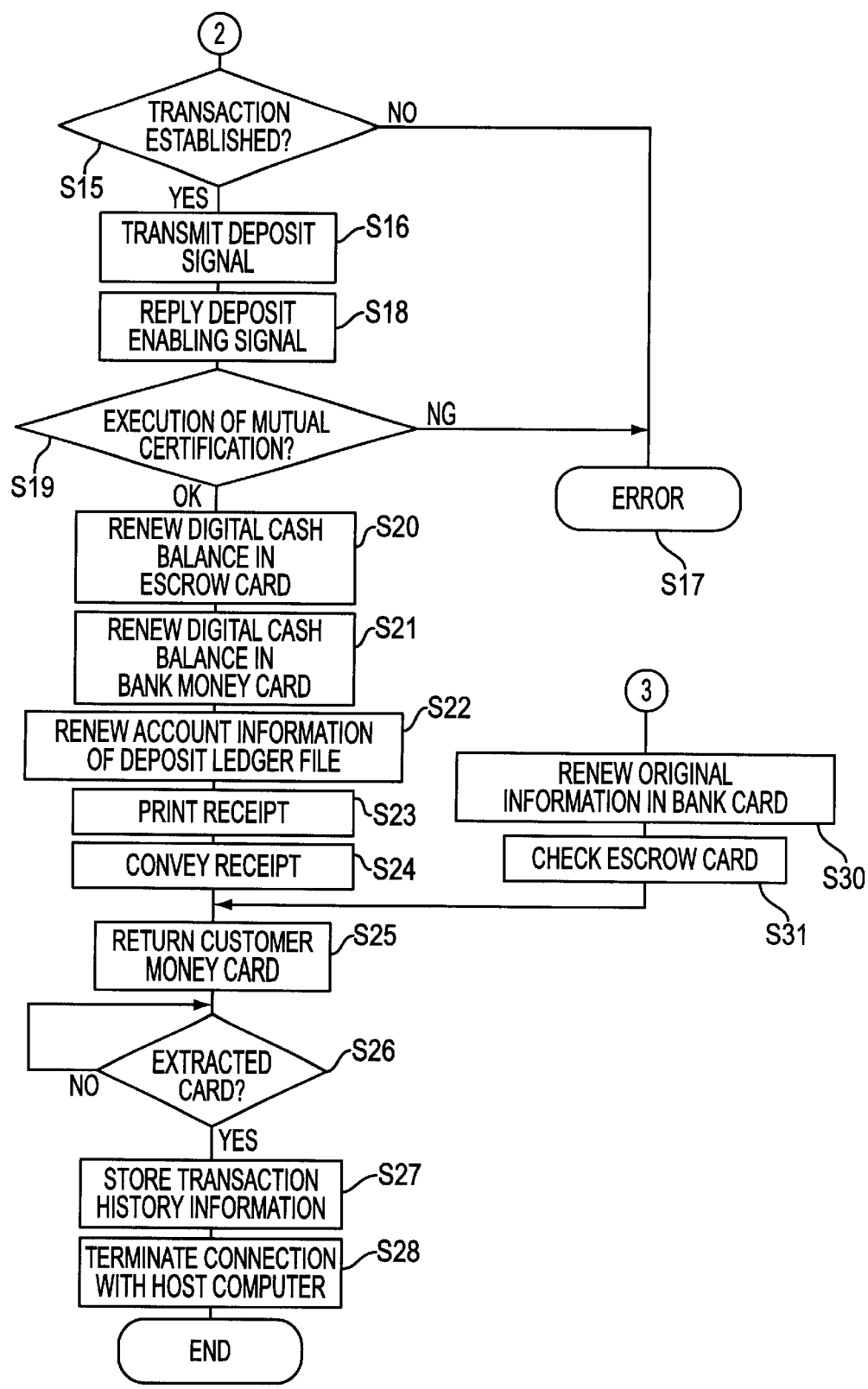

Referring to the flow charts of FIGS. 6 and 7, the steps of a transaction in which a customer's microchip card is used to deposit digital cash in the bank are explained.

Figure 8:
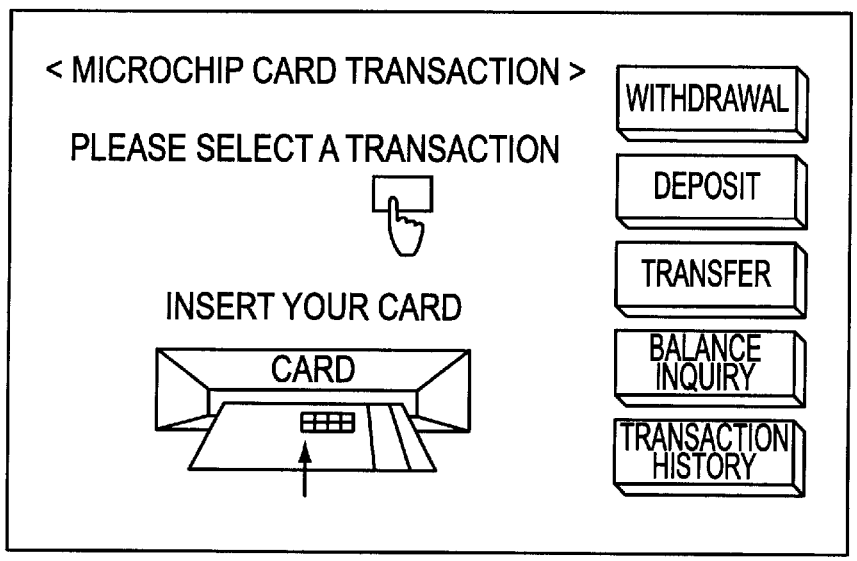

When a customer approaches the automatic teller machine 100, the approach detection device 183 detects his or her presence. In response, the automatic teller machine 100 changes the display of the touch screen on the customer operation panel 130 from a waiting screen to a screen that requests the customer to input information describing the transaction the customer desires to perform. When the customer inputs "electronic transaction" on the touch screen, the screen changes to the screen hen in FIG. 8 (step S1 of FIG. 6) showing that a microchip card transaction has been selected.

The message "insert your card" is displayed on the screen in a flickering mode, and the customer inserts the money card 10 in the card insertion/return opening 111 (Step S2), following which the magnetic information reader 114 reads the magnetic information stored in the magnetic stripe 31 on the customer money card 10. If it is determined that the card 10 is valid based on the magnetic information stored on stripe 31, the embossed character reader 115 reads the embossed character area 32 on the customer money card 10, and the information stored on stripe 31 and in area 32 is stored in memory 181. Next, the card handling unit 110 conveys the customer money card 10 to the microchip card reader/writer 116 and reads the customer information stored in the integrated circuit 33 (Step S3).

When the customer information is read normally from the customer money card 10 and initiation of the transaction is established by the customer money card 10 and the automatic teller machine 100 (Step S4), the customer information is transmitted to the host computer 300, which retrieves the customer's information from the deposit ledger file 410 inside the storage device 400 (Step S5). The host computer 300 accesses the deposit ledger file 410 of the storage device 400 an reads out the customer's account information, including the customer's bank balance information.

If initiation of the transaction can not be established in step S4 because, for example, a malfunction occurs in the data communication path, the transaction is interrupted, and the customer money card 10 is returned to the customer from inside the automatic teller machine 100 (Step S6).

Assuming no malfunction has occurred, the customer money card 10 and the escrow card 30 confirm mutually by a specified algorithm whether the card 10 can be used to complete the transaction (Step S7). If it is determined that the customer money card 10 can be used to complete the transaction, the host computer 300 transmits the customer account information to the automatic teller machine 100. When the automatic teller machine 100 receives this account information, the screen shown in FIG. 9 is displayed on the customer operation panel 130 (Step S8). For example, in FIG. 9, the balance in the customer's account is displayed on the screen as $2511.63, and the digital cash balance of the customer money card 10 is displayed on the lower part of the screen as $1604.18. Thus, a transaction limit amount in digital cash is displayed as $1604.18. The customer confirms that the display is correct in step S8 and inputs the transaction amount (Step S9).

The main control unit 190 then compares the transaction amount with the digital cash balance in the customer money card 10, and the main control unit 190 determines whether the transaction amount is less than the digital cash balance (Step S10). If the transaction amount is less than the digital cash balance in the customer money card 10, digital cash corresponding to the transaction amount is transferred from the customer money card 10 to the escrow card 30 (Step S11–S12). On the other hand, if the transaction amount is larger than the digital cash balance stored in the customer money card 10 in step S10, transaction limit amount "$91604.18" on the screen is blinked to notify the customer that the requested transaction exceeds the limit.

After confirmation of the transaction amount, the main control unit 190 transmits arithmetic commands and data to the customer money card 10 and the escrow card 30 respectively. A subtraction command and the transaction amount are transmitted to the customer money card 10, and the digital cash balance stored in the customer money card 10 is renewed. For example, if the transaction amount is $1000, then the micro-processor 33e in the card 10 subtracts $1000 from the stored digital cash balance ($1604.18). As a result, the distal cash balance stored in the customer money card 10 becomes $604.18=$1604.18−$1000.

Additionally, an addition command and the transaction amount are transmitted to the escrow card 30, and the digital cash balance stored in the escrow card 30 is renewed. If the transaction amount is $1000 as mentioned above, then the micro-processor 33e in the card 30 adds $1000 to the stored digital cash balance ($0), which becomes zero after the transaction has been completed. As a result, the digital cash balance stored in the escrow card 30 becomes $1000=$0+$1000.

After the renewal of the balance, the customer money card 10 and the escrow card 30 transmit the renewed balance to the main control unit 190. The main control unit 190 confirms that the renewed balance is correct as follows. For the confirmation, the latest balances before renewal and the transaction amount are used. In the above mentioned example, the latest balance in the customer money card 10 is $1604.18, which is stored in the memory 181 or the escrow card 30. The latest balance in the escrow card 30 is zero, which is stored in the memory 181. The transaction amount is $1000, which is stored in the memory 181 or the escrow card 30. The main control unit 190 adds the transaction amount ($1000) to the renewed balance of the customer money card 10 ($604.18) and confirms that the sum ($604.18+$1000) equals the latest balance of the customer money card 10 ($1604.18). Further, the main control unit 190 subtracts the transaction amount ($1000) from the renewed balance of the escrow card 30 ($1000) and confirms that the result ($1000-$1000) equals to the latest balance of the escrow card 10 ($0).

In the above description, the confirmation is performed by the main control unit 190. It can also be performed by the micro-processor 33e in the customer money card 10 and the escrow card 30. In this way, the customer money card 10 and the escrow card 30 transmit the status data showing that the renewal has been completed to the main control unit 190.

Next, the renewed digital cash balance 35b is read from the escrow card 30 and displayed on the customer operation panel 130 (Step S13). The customer confirms this display by pressing the 'Confirmation' key (Step S14). If the "confirmation" key is pressed by the customer in step S14, the renewed digital cash balance in the customer money card 10 and the renewed digital cash balance 35b in the escrow card 30 are fixed. At this point, the ownership of digital cash in the escrow card 30 is transferred from the customer to the bank. Before the confirmation by the customer, the ownership of digital cash in the escrow card 30 transferred from the customer money card is still with the customer, even though the escrow card 30 is owned by the bank, but the ownership is transferred to the bank after the confirmation.

On the other hand, if there is an error in the transaction amount, the customer presses the 'amendment' key. In this case, an amendment input screen is displayed on the customer operation panel 130, and the operation is returned to the point of the flow chart of FIG. 6 just prior to step S8.

A transfer of digital cash from the escrow card 30 to the bank money card 20 will be discussed below.

Referring to FIG. 7, when the transaction is established by the bank money card 20 and the escrow card 30 (Step S15), the escrow card 30 transmits a deposit confirmation signal to the bank money card 20 (Step S16). If the transaction can not be established in step S15, it is interrupted as an error (Step S17).

If the bank money card 20 receives the deposit confirmation signal from the escrow card 30, and if it is possible to receive the amount, the bank money card 20 transmits a deposit enabling signal to the escrow card 30 (Step S18). When the card 30 receives the deposit enabling signal, the bank money card 20 and the escrow card 30 are confirmed mutually by a specified algorithm whereby the cards are used to complete the transaction (Step S19).

If it is determined that the cards can be used to complete the transaction, digital cash stored in the escrow card 30 is transferred to the bank money card 20 as follows (Steps S20–S21). The main control unit 190 reads the digital cash balance information (e.g., $1000, as above) from the escrow card 30 and stores it in the memory 181. Then, the main control unit 190 transmits arithmetic commands and data to the escrow card 30 and the bank money card 20 respectively. A subtraction command and the digital cash balance information ($1000) read from the escrow card 30 are transmitted to the escrow card 30 and the digital cash balance stored in the escrow card 30 is renewed. In the above example, the digital cash balance stored in the escrow card 30 is $1000; therefore, the microprocessor 33e in the card 30 subtracts $1000 from the stored digital cash balance($1000). As a result, the digital cash balance stored in the escrow card 30 becomes zero=$1000−$1000.

On the other hand, an addition command and the digital cash balance information ($1000) are transmitted to the bank money card 20, and the digital cash balance stored in the bank money card 20 is renewed. The microprocessor 33e in the card 20 adds $1000 to the stored digital cash balance ($10000). As a result, the digital cash balance stored in the bank money card 20 becomes $11000=$10000+$1000.

After the renewal of the balance, the confirmation that the renewed balance is correct is performed, as mentioned above.

Next, the transaction information is transmitted to the host computer 300, and the deposit ledger file 410 of the customer is renewed (Step S22).

The receipt handling unit 120 prints the customer's full name, account number, transaction amount, new digital cash balance information and embossed character information on the receipt 40 (Step S23) and conveys the receipt to the opening 117 (Step S24).

The customer money card 10 is removed from its physical and electrical connections with the microchip card reader/writer 116 and is removed with the receipt 40 from the card insertion/return opening 111 (Step S25). When the customer extracts the money card 10 from the card insertion/return opening 111, the detection device 113 detects the extraction (Step S26). In response to detection of the card extraction by the detection device 113, the memory 181 stores the transaction history (Step S27), and the automatic teller machine 100 terminates the connection with the host computer 300 and completes the transaction (Step S28).

In step S14, if the customer presses the "cancellation" key, the message "Push the confirmation key because transaction is interrupted" is displayed on the customer operation panel 130 (Step S29). If the customer presses the "confirmation" keys digital cash in the escrow card 30 is transferred to the customer money card 10. The process of transferring digital cash in the escrow card 30 to the customer money card 10 is similar to the transfer from the escrow card 30 to the bank money card 20 mentioned above. Thus, the amount of digital cash in the escrow card becomes zero, and the amount of digital cash in the customer money card becomes the amount it originally contained (Step S30). After that, the customer money card 10 is returned to the customer from the card insertion/return opening 111 (Step S31).

In the above procedure, a responsibility demarcation point is established at the point when the customer confirms that the digital cash balance in the escrow card 30 equals the transaction amount. Therefore, ownership of the monetary value of the transaction can be distinguished clearly.

A deposit with an electronic check is similar to the one with digital cash mentioned above.

Figure 10:
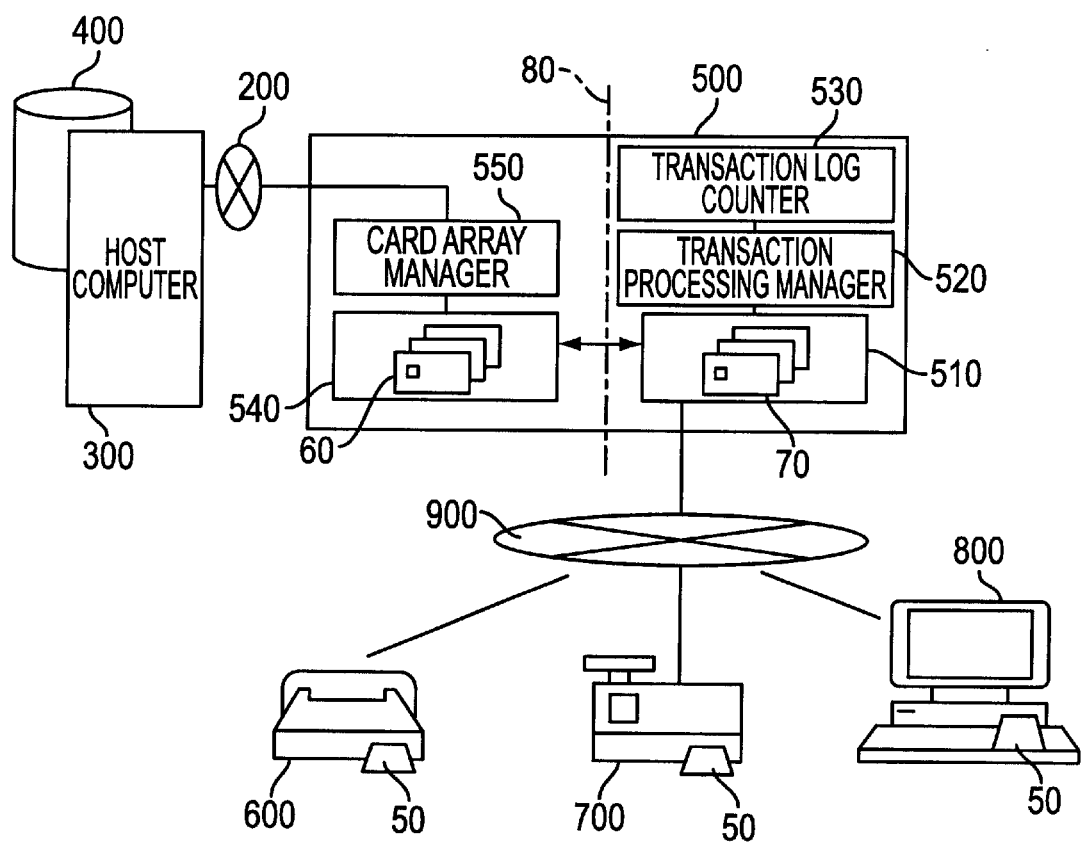
FIG. 10 is a diagrammatic illustration of an electronic transaction system according to a second embodiment of the present invention.

Referring to FIG. 10, the second embodiment of the invention is explained.

A money control server 500 is installed at a money control center placed under the control of banking facilities and is composed of a virtual automatic teller machine 510, a transaction processing manager 520, a transaction log counter 530, a card safe 540, and a card array manager 650.

The virtual automatic teller machine 510 consists of a plurality of escrow cards 70 and actuates these cards in the same way as the automatic teller machine 100 (FIG.2) actuates the escrow card 30. This vital automatic teller machine 510 is controlled by the transaction processing manager 520. The transaction log counter 530 stores transaction information and the number of transactions. The card safe 540 has a plurality of bank money cards 60 fixed to a plurality of microchip card reader/writer units (not shown) and is controlled by the card array manager 550 to receive the information stored in the escrow cards 70. The card array manager 550 is connected to a host computer 300, which controls a storage device 400 having a deposit ledger file 410, through a communication line 200.

A communication line 900, which is a public or leased line, connects home peripheral equipment 600, a point-of-sale terminal 700 and a personal computer 800 to the money control server 500.

The home peripheral equipment 600 is composed of a telephone having a plurality of functions and a microchip card reader/writer, and is need to trade between a customer money card 50 and a bank money card 60. The point-of-sale terminal 700 is provided at retail stores and connects the customer money card 50 to the bank money card 60 in order to trade between these cards. The personal computer 800 also trades between the customer money card 50 and the bank money card 60.

Figure 11:
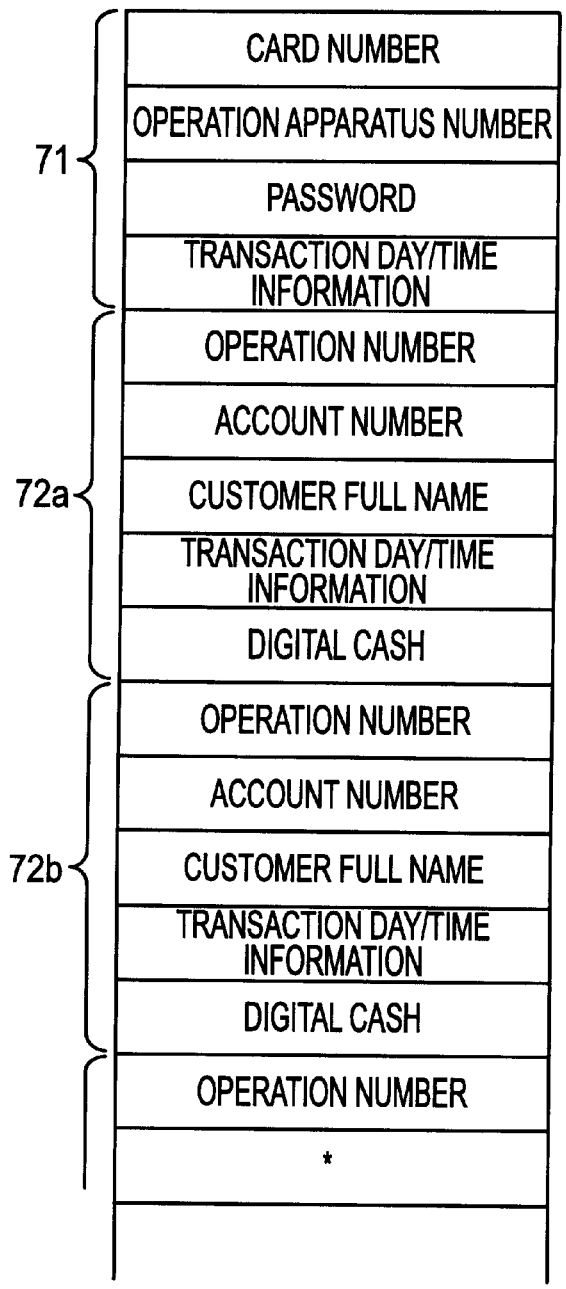
FIG. 11 shows a data format of the escrow card of FIG. 10.

The data stored within the escrow card will now be described with reference to FIG. 11, which divides the data into two parts: a discrimination information part 71 and a customer information part having two portions 72a and 72b. The discrimination information part 71 consists of a card number, an operation apparatus number, a password and transaction day/time information. The customer information part 72a consists of an operation number, an account number, the customer's full name, transaction day/time information and digital cash transferred from the customer money card 50. The customer transaction information part 72b is the same data format as the customer transaction information 72a. A record area of such customer transaction information is provided by a plurality of EEPROMs 33d (FIG. 4(b),) and the information is stored for every transaction. Further, a plurality of types of escrow cards 70 are provided, one for every type of customer money card 50, to provide different transaction modes. The bank money cards 60 are housed in the card safe 540 provided for every escrow card 70.

Next, an electronic transaction using the point-of-sale terminal 700 is explained. A customer inserts his or her customer money card 50 in the point-of-sale terminal 700. The point-of-sale terminal 700 is connected to the money control server 500 through the public line 900 and requests the customer to input information describing the transaction the customer desires to perform.

If the customer selects "deposit", the money control server 500 demands the input of a transaction amount by the customer through the point-of-sale terminal 700.

When the customer inputs the transaction amount in the point-of-sale terminal 700, the point-of-sale terminal 700 transmits a voltage/clock signal to the terminal 33a on the customer money card 50 with a specified sequence and reads the information in the customer money card 50. When the point-of-sane terminal 700 transmits the specified information for a certification to the money control server 500, the micro-processor 33e in the escrow card 70 replies by transmitting certification data to the point-of-sale terminal 700 and certifies mutuality by a specified communication protocol. If mutual certification is obtained, other information in the customer money card 50 is sent to the money control server 500.

Next, the transaction amount is compared with the digital cash balance in the customer money cam 50. If the transaction amount is less than the digital cash balance in the customer money card 10, digital cash corresponding to the transaction amount is transferred from the customer money card 50 to the money control server 500. The money control server 500 stores it in the escrow card 70 as digital cash. The money control server 500 then reads the digital cash balance information of the escrow card 70 and transmits it to the point-of-sale terminal 700. The point-of-sale terminal 700 displays it on a display (not shown) and requests confirmation.

When the customer confirms that the digital cash balance on the display, which shows the digital cash balance of the escrow card 70, equals the transaction amount, the point-of-sale terminal 700 stores the operation number, transaction day/time, transaction amount in the customer money card 50 and terminates the deposit processing with the money control server 500. At this point of the transaction, the ownership of digital cash in the escrow card 30 is transferred from the customer to the bank. That is, digital cash is handled in the sank money card 60 controlled by the card array manager 550. Further, final settlement is the point where the balance information in the deposit ledger file 410 corresponding to the account of the customer is renewed on the basis of the digital cash balance in the escrow card 70. This settlement is made in real time or processed later.

As many apparently widely different embodiments of this invention may be made without departing from the spirit and scope thereof, it is to be understood that the invention is not limited to the specific embodiments thereof except as defined in the appended claims.

What is claimed is:

1. An electronic transaction processing system for transferring a monetary value between a payer and a receiver, comprising:

a first memory apparatus owned by the payer, said first memory apparatus storing the payer's digital cash;

a second memory apparatus owned by the receiver, said second memory apparatus storing the receiver's digital cash;

a third memory apparatus for temporarily storing the digital cash transferred from the first memory apparatus; and an automatic teller machine containing said second memory apparatus and said third memory apparatus, said automatic teller machine further comprising:
means for inserting and discharging said first memory apparatus; and an operation apparatus for carrying out a transaction between the payer and the receiver using the first, second and third memory apparatus, said operation apparatus having a display for displaying an amount of the transaction, a confirmation key and means for transferring digital cash from the first memory apparatus to the third memory apparatus and from the third memory apparatus to the second memory apparatus, wherein when the payer enters a transaction amount to the operation apparatus, said transferring means transfers digital cash corresponding to the transaction amount from the first memory apparatus to the third memory apparatus, and wherein when the payer confirms the amount displayed by said display, said amount corresponding to the digital cash transferred from the first memory apparatus to the third memory apparatus, said transferring means transfers the digital cash transferred to the third memory apparatus from the third memory apparatus to the second memory apparatus, and wherein said automatic teller machine provides a screen for displaying a transaction limit amount, the transaction limit amount on the screen flickering when the payer request a transaction amount that exceeds the transaction limit amount.

2. A system according to claim 1, wherein the digital cash of the payer stored in said third memory apparatus is returned to said first memory apparatus, the return of said digital cash to said first memory apparatus occurring when the payer cancels the transaction after deducting the transaction amount from the digital cash of the payer in said first memory apparatus.

3. A system according to claim 1, wherein said automatic teller machine provides a screen for displaying at least balance information of digital cash stored in the first memory apparatus and balance information in an account of said payer.

4. A system according to claim 1, wherein said first memory apparatus, said second memory apparatus and said third memory apparatus are cards, each of which contains a microchip.

5. A system according to claim 1, wherein a plurality of said third memory apparatus are provided, one of said plurality of third memory apparatus being selected in response to characteristics of said first memory apparatus.

6. A system according to claim 1, wherein said first memory apparatus transmits the digital cash to the third memory apparatus through a communication line.

7. A method of transferring a monetary value between a payer and a receiver, comprising the steps of:

receiving in an operation apparatus a first memory apparatus belonging to the payer and storing digital cash of the payer;

prompting the payer to confirm an amount of digital cash to be transferred;

receiving a response to said prompting from payer;

transferring digital cash of the payer in the first memory apparatus to a third memory apparatus contained in said operation apparatus;

transferring digital cash in the third memory apparatus to a second memory apparatus belonging to the receiver;

updating the balance of digital cash in the first memory apparatus; and discharging the first memory apparatus from the operation apparatus.

8. A method according to claim 7, further comprising the step of:

displaying information on a digital cash balance stored in said first memory apparatus.

9. A method according to claim 7, further comprising the step of:

receiving information from the payer, said information determining a type and amount of digital cash to be transferred.

10. A method according to claim 9, further comprising the step of:

prompting the payer to enter new information if the received information corresponds to a transfer that can not be executed.

11. A method of transferring a monetary value between a payer and a receiver, comprising the steps of:

receiving in an operation apparatus a first memory apparatus belonging to the payer and storing digital cash of the payer;

transferring digital cash of the payer in the first memory apparatus to a third memory apparatus contained in said operation apparatus;

storing in said third memory apparatus digital cash to be transferred from the payer to receiver until payer confirms the amount of digital cash stored in said third memory apparatus;

transferring digital cash in the third memory apparatus to a second memory apparatus belonging to the receiver;

updating the balance of digital cash in the first memory apparatus; and discharging the first memory apparatus from the operation apparatus.

12. A method according to claim 11, further comprising the steps of:

displaying information on a digital cash balance stored in said first memory apparatus.

13. A method according to claim 11, further comprising the step of:

receiving information from the payer, said information determining a type and amount of digital cash to be transferred.

14. A method according to claim 13, further comprising the step of:

prompting the payer to enter new information if the received information corresponds to a transfer that can not be executed.

* * * * *